(12) United States Patent
Yang et al.

(10) Patent No.: US 10,612,112 B2
(45) Date of Patent: Apr. 7, 2020

(54) NOBLE METAL MATERIAL FOR 3-DIMENSIONAL PRINTING, METHOD FOR MANUFACTURING THE SAME, AND METHOD FOR 3-DIMENSIONAL PRINTING USING THE SAME

(71) Applicants: Electronics and Telecommunications Research Institute, Daejeon (KR); Daelim Chemical Co., Ltd., Gyeongsangnam-do (KR)

(72) Inventors: Yong Suk Yang, Daejeon (KR); Hong Hyun Shin, Seoul (KR); In-Kyu You, Gongju-Si (KR); Sunghoon Hong, Daejeon (KR)

(73) Assignees: ELECTRONICS AND TELECOMMUNICATIONS RESEARCH INSTITUTE, Daejeon (KR); DAELIM CHEMICAL CO., LTD., Gyeongsangnam-Do (KR)

( * ) Notice: Subject to any disclaimer, the term of this patent is extended or adjusted under 35 U.S.C. 154(b) by 929 days.

(21) Appl. No.: 15/094,604

(22) Filed: Apr. 8, 2016

(65) Prior Publication Data
US 2016/0298213 A1    Oct. 13, 2016

(30) Foreign Application Priority Data

Apr. 9, 2015 (KR) .................. 10-2015-0050144
Dec. 29, 2015 (KR) .................. 10-2015-0188766

(51) Int. Cl.
*C22C 5/02* (2006.01)
*C22C 1/02* (2006.01)
(Continued)

(52) U.S. Cl.
CPC .............. *C22C 5/02* (2013.01); *B22D 21/005* (2013.01); *B22D 23/00* (2013.01); *B22D 23/003* (2013.01);
(Continued)

(58) Field of Classification Search
CPC .... C22C 5/02; B23K 35/3013; B23K 2103/08
See application file for complete search history.

(56) References Cited

U.S. PATENT DOCUMENTS

| 5,234,343 A | 8/1993 | Shoher et al. |
| 2008/0304999 A1 | 12/2008 | Ishikawa et al. |

(Continued)

FOREIGN PATENT DOCUMENTS

| CN | 1587426 A | 3/2005 |
| CN | 1940102 A | 4/2007 |
| CN | 101313396 A | 11/2008 |
| CN | 102066045 A | 5/2011 |
| CN | 102083582 A | 6/2011 |
| CN | 102251140 A | 11/2011 |
| CN | 103014401 A * | 4/2013 |

(Continued)

OTHER PUBLICATIONS

Robert L. O'Brien, ed., Jefferson's Welding Encyclopedia, Eighteenth ed., 1997, pp. 101-102. (Year: 1997).*

(Continued)

*Primary Examiner* — Scott R Kastler
*Assistant Examiner* — Vanessa T. Luk
(74) *Attorney, Agent, or Firm* — Rabin & Berdo, P.C.

(57) ABSTRACT

Provided is a noble metal material for 3D printing, the noble metal material including an alloy that contains gold (Au) and a first metal that is different from the gold, wherein the alloy contains about 50 wt % to about 100 wt % of the gold and contains more than about 0 wt % and at most about 50 wt % of the first metal, and the melting point of the alloy is at most 400° C.

18 Claims, 5 Drawing Sheets

(51) Int. Cl.

| | | |
|---|---|---|
| *B22F 3/00* | (2006.01) | |
| *B23K 35/30* | (2006.01) | |
| *B23K 103/08* | (2006.01) | |
| *C22C 1/04* | (2006.01) | |
| *B22D 21/00* | (2006.01) | |
| *B22D 23/00* | (2006.01) | |
| *B33Y 10/00* | (2015.01) | |
| *B33Y 70/00* | (2020.01) | |
| *B22F 3/115* | (2006.01) | |
| *C04B 35/653* | (2006.01) | |
| *C04B 35/26* | (2006.01) | |
| *C04B 35/45* | (2006.01) | |
| *B22F 3/20* | (2006.01) | |
| *B22F 3/105* | (2006.01) | |

(52) U.S. Cl.
CPC .............. *B22F 3/008* (2013.01); *B22F 3/115* (2013.01); *B33Y 10/00* (2014.12); *B33Y 70/00* (2014.12); *C04B 35/26* (2013.01); *C04B 35/45* (2013.01); *C04B 35/653* (2013.01); *C22C 1/02* (2013.01); *C22C 1/0466* (2013.01); *B22F 3/1055* (2013.01); *B22F 3/20* (2013.01); *B23K 35/3013* (2013.01); *B23K 2103/08* (2018.08); *C04B 2235/6021* (2013.01); *C04B 2235/6026* (2013.01); *C04B 2235/6565* (2013.01); *Y02P 10/295* (2015.11)

(56) References Cited

U.S. PATENT DOCUMENTS

| | | | |
|---|---|---|---|
| 2010/0051319 A1* | 3/2010 | Schmitt | B23K 35/3006 |
| | | | 174/126.1 |
| 2011/0180929 A1 | 7/2011 | Lichtenberger | |
| 2014/0063124 A1 | 3/2014 | Yang et al. | |
| 2014/0356226 A1 | 12/2014 | Taniguchi et al. | |
| 2017/0100802 A1* | 4/2017 | Kobayashi | C23C 16/26 |

FOREIGN PATENT DOCUMENTS

| | | |
|---|---|---|
| CN | 103014401 A | 4/2013 |
| CN | 103042920 A | 4/2013 |
| CN | 103290251 A | 9/2013 |
| CN | 104233039 A | 12/2014 |
| CN | 203992400 U | 12/2014 |
| JP | H07-184932 A | 7/1995 |
| KR | 10-1990-700273 | 8/1990 |
| KR | 10-2009-0090372 A | 8/2009 |
| KR | 10-2014-0065459 A | 5/2014 |
| WO | WO-8910254 A1 | 11/1989 |
| WO | WO-2008073297 A2 | 6/2008 |
| WO | WO 2011-078918 A2 | 6/2011 |
| WO | WO-2013044047 A1 | 3/2013 |
| WO | WO-2014/074947 A2 | 5/2014 |

OTHER PUBLICATIONS

A Dictionary of Science, Sixth ed., Oxford University Press, 2010, pp. 750-751. (Year: 2010).*

* cited by examiner

NOBLE METAL MATERIAL FOR 3-DIMENSIONAL PRINTING, METHOD FOR MANUFACTURING THE SAME, AND METHOD FOR 3-DIMENSIONAL PRINTING USING THE SAME

CROSS-REFERENCE TO RELATED APPLICATIONS

This U.S. non-provisional patent application claims priority under 35 U.S.C. § 119 of Korean Patent Application Nos. 10-2015-0050144, filed on Apr. 9, 2015, and 10-2015-0188766, filed on Dec. 29, 2015, the entire contents of which are hereby incorporated by reference.

BACKGROUND

The present disclosure herein relates to a material for 3D printing, and more particularly, to a noble metal material for 3D printing.

3D printing methods, which are being actively developed recently, can use 3D printers to receive information that is designed three dimensionally and print three dimensional shapes. 3D blueprints are drawn using programs such as 3D CAD which are capable of drafting the 3D blueprints for 3D printing. Models can be created from scratch but are also made by using a template to modify a basic form. Some 3D printing service companies provide online tools which allow even laypersons to easily produce 3D blueprints. In addition, instead of drawing the blueprint, 3D blueprints are also made by using only a 3D scanner or through a mechanical method by taking a photograph.

3D printing is already used by industry in parts of the production process. Recently, expectations and demand are increasing for a new market in product mockups of accessories, and the like, using the customized low-volume, high-variety production processes of 3D printing.

SUMMARY

An object of the present disclosure is to provide a noble metal for 3D printing which can be melt laminated at or below about 400° C.

Another object of the present disclosure is to provide a noble metal for 3D printing, in which the noble metal material can be melt laminated (FDM method, hot melt method) with a plastic material in a single process.

Another object of the present disclosure is to provide a method for manufacturing a noble metal material for 3D printing which can be melt laminated at or below about 400° C.

Still another object of the present disclosure is to provide a 3D printing method that uses a noble metal material for 3D printing which can be melt laminated at or below about 400° C.

However, objects of the present disclosure are not limited to the above-described objects.

An embodiment of the inventive concept provides a noble metal material for 3D printing, the noble metal material including an alloy that contains gold (Au) and a first metal that is different from the gold, wherein the alloy contains about 50 wt % to about 100 wt % of the gold and contains more than about 0 wt % and at most about 50 wt % of the first metal, and the melting point of the alloy is at most 400° C.

In an embodiment, the first metal may be any one of tin (Sn), silicon (Si), germanium (Ge), antimony (Sb), or gallium (Ga).

In an embodiment, the alloy may further include a second metal, the second metal being a different metal from the gold and the first metal, and the alloy containing more than about 0 wt % and at most about 25 wt % of the second metal.

In an embodiment, the first metal may be germanium (Ge).

In an embodiment, the second metal may be any one of gallium (Ga), indium (In), or bismuth (Bi).

In an embodiment, the first metal may be any one of tin (Sn), silicon (Si), or antimony (Sb).

In an embodiment, the second metal may be any one of gallium (Ga), indium (In), germanium (Ge), or bismuth (Bi).

In an embodiment, the alloy may further contain a third metal, the third metal being a different metal than the gold, the first metal, and the second metal, and the alloy containing more than about 0 wt % and at most about 5 wt % of the third metal.

In an embodiment, the third metal may be any one of copper (Cu), silver (Ag), platinum (Pt), or palladium (Pd).

In an embodiment, the noble metal material for 3D printing may further include a metal particle or a metal oxide particle, the melting point of the metal particle exceeding about 400° C., and the melting point of the metal oxide particle exceeding about 400° C.

In an embodiment, the metal particle may contain at least one of gold (Au), silver (Ag), platinum (Pt), tin (Sn), or copper (Cu), and the metal oxide particle may include at least one of a copper oxide particle or an iron oxide particle.

In an embodiment, the metal particle may include a gold (thin film)/nickel phosphorus (thin film)/copper (core) (Au/NiP/Cu) particle that exhibits a gold luster and is obtained by using an electroless plating method, and the like, to successively coat nickel phosphorus (NiP) and gold (Au) to a thickness of about several micrometers (μm) on the surface of a base of copper.

In an embodiment, the metal oxide particle may exhibit a gold luster and include mica which is coated with titanium oxide (TiO2), copper oxide, or iron oxide.

In an embodiment, the noble metal material for 3D printing according to an embodiment of the inventive concept may be powder shaped, granular shaped, or filament shaped.

In an embodiment, the noble metal material for 3D printing according to an embodiment of the inventive concept may be a liquid phase.

In an embodiment of the inventive concept, a 3D printing method includes melting a noble metal material by performing heat treatment at a temperature of about 280° C. to about 400° C.; and forming a three dimensional structure by extruding the molten noble metal material through a nozzle and then cooling the molten noble metal, wherein the noble metal material includes an alloy that contains gold (Au) and a first metal that is different from the gold, the alloy contains about 50 wt % to about 100 wt % of the gold, and contains more than about 0 wt % and at most about 50 wt % of the first metal, and the melting point of the alloy is at most 400° C.

In an embodiment, the alloy further may further include a second metal, the second metal being a different metal from the gold (Au) and the first metal, and the alloy containing more than about 0 wt % and at most about 25 wt % of the second metal.

In an embodiment, the alloy may further contain a third metal that is different from the gold (Au), the first metal, and the second metal, the third metal being any one of copper (Cu), silver (Ag), platinum (Pt) or palladium (Pd), and the alloy containing more than about 0 wt % and at most about 5 wt % of the third metal.

In an embodiment, the noble metal material for 3D printing may further include a metal particle or a metal oxide particle, the melting point of the metal particle exceeding about 400° C., and the melting point of the metal oxide particle exceeding about 400° C.

In an embodiment, melting and laminating a plastic material may be further included, wherein the noble metal material and the plastic material form a single three dimensional structure.

In an embodiment, the first metal may be any one of tin (Sn), silicon (Si), germanium (Ge), antimony (Sb), or gallium (Ga).

In an embodiment, the first metal may be germanium (Ge).

In an embodiment, the second metal may be any one of gallium (Ga), indium (In), or bismuth (Bi).

In an embodiment, the first metal may be any one of tin (Sn), silicon (Si), or antimony (Sb).

In an embodiment, the second metal may be any one of gallium (Ga), indium (In), germanium (Ge), or bismuth (Bi).

In an embodiment of the inventive concept, a method for manufacturing a noble metal material for 3D printing includes forming a first liquid alloy by melting gold (Au) and a first metal at a first temperature; and forming a solid alloy through a first cooling of the first liquid alloy, wherein the first liquid alloy contains about 50 wt % to about 100 wt % of the gold (Au) and contains more than about 0 wt % and at most about 50 wt % of the first metal, and the first temperature is higher than the melting temperature of the gold (Au) and the melting temperature of the first metal.

In an embodiment, the melting process may be performed under a vacuum atmosphere, a foaming gas atmosphere, or an inert gas atmosphere.

In an embodiment, in the first cooling, the temperature may decrease at a rate of about 50° C. to 200° C. per minute. In an embodiment, forming a second liquid alloy through a second heat treatment of the solid alloy at a second temperature which is lower than the first temperature; forming a mixture by mixing the second liquid alloy with at least one of a metal particle or a metal oxide particle; and performing a second cooling on the mixture may be included, wherein the second temperature exceeds the melting point of the solid alloy and is below the melting points of the metal particle and the metal oxide particle.

In an embodiment of the inventive concept, a 3D printing apparatus includes a noble metal material supplying part; a plastic material supplying part; a first nozzle receiving the noble metal material which is supplied from the noble metal material supplying part to melt and discharge the noble metal material; a second nozzle receiving the plastic material which is supplied from the plastic material supplying part to melt and discharge the plastic material; and a controlling part that moves the first nozzle and the second nozzle, wherein the noble metal material is a mixture of a first alloy containing gold (Au), a first metal, and a second metal, and a metal oxide particle, the first metal being any one of tin (Sn), silicon (Si), germanium (Ge), or antimony (Sb) and the second metal being any one of gallium (Ga), indium (In), germanium (Ge), or bismuth (Bi), and the first nozzle includes a first heating part that melts the noble metal material by performing heat treatment at a temperature of about 280° C. to about 400° C.

In an embodiment, the first nozzle may further include; an opening which discharges the molten noble metal material; and a second heating part disposed between the first heating part and the opening, the second heating part heating the molten noble metal material to a lower temperature than the first heating part.

In an embodiment, the inside of the first nozzle may be filled with a foaming gas or an inert gas.

In an embodiment, the material in the first nozzle may be one of a ceramic, Teflon, a quartz, or an aluminum that has an anodized surface.

In an embodiment, a supplying tube may be further included between the noble metal material supplying part and the first nozzle, wherein the first nozzle further includes a cooling part which is adjacent to an outlet of the supplying tube which discharges the noble metal material, the cooling part cooling the noble metal material discharged from the supplying tube to a temperature equal to or below the melting point of the noble metal material.

DETAILED DESCRIPTION

Figure 1:
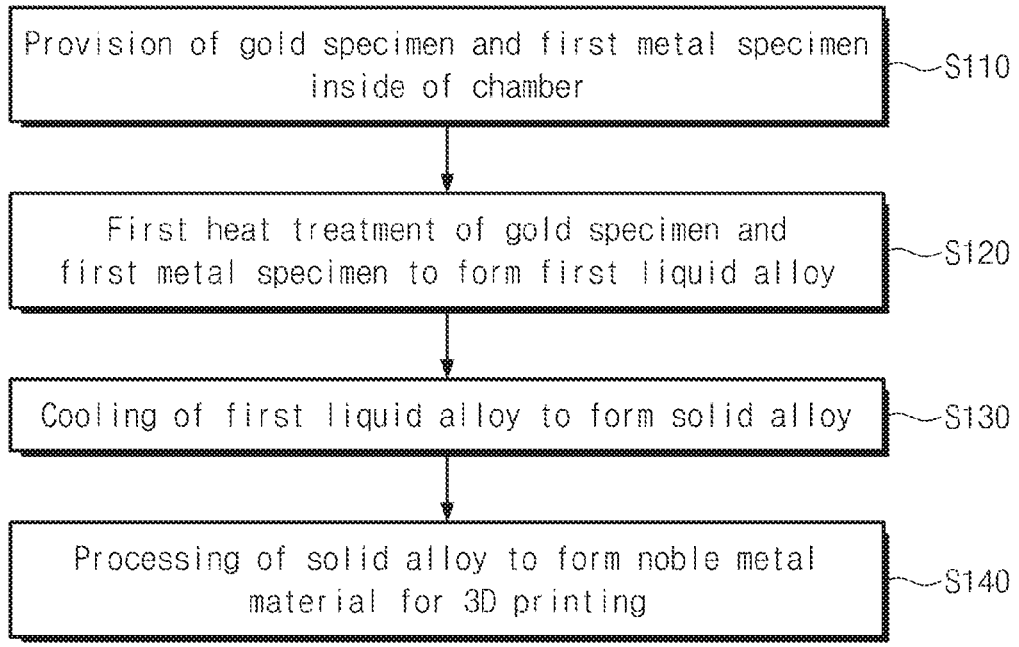
FIGS. 1 to 4 are flow charts for illustrating a method for manufacturing a noble metal material for 3D printing according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In the disclosure, it will be understood that when an element is referred to as being on another element, it can be directly on the other element, or intervening elements may also be present. Like reference numerals refer to like elements throughout.

Embodiments described herein are described with reference to flow charts or enlarged views, which are exemplary drawings of the technical concept of the inventive concept. In the drawings, the thicknesses of areas are exaggerated for effective description of the technical contents. Areas illustrated in the drawings are approximate in nature. The shapes of such areas are merely for illustrating particular forms or areas in elements, and do not limited the scope of the inventive concept. It will be understood that, although the terms first, second, third, etc. may be used herein to describe various elements, these elements should not be limited by these terms. These terms are only used to distinguish one element from another element. The embodiments described herein also include complementary embodiments thereof.

The terms used herein are for describing exemplary embodiments and do not limit the inventive concept. In the specification, singular forms also include the plural forms as well, unless the context clearly indicates otherwise. The terms "comprises" and/or "comprising", when used in this specification, do not preclude the presence or addition of one or more other elements.

Hereinafter, detailed description of the present invention is given by describing exemplary embodiments of the technical concept of the present invention with reference to the accompanying drawings.

FIGS. 1 to 4 are flow charts for illustrating a method for manufacturing a noble metal material for three-dimensional printing (hereinafter, 3D printing) according to an embodiment of the inventive concept. The noble metal material according to an embodiment of the inventive concept may be for 3D printing using a fused deposition modeling (FDM) method, a material extrusion (ME) method, a material jetting (MJ) method, a hot-melt method, a selective laser sintering (SLS) method, a direct energy deposition (DED) method, or a power bed fusion (PBF) method.

Referring to FIG. 1, a gold specimen and a first metal specimen may be provided inside of a chamber S110. In an embodiment, at least about 50 wt % and less than about 100 wt % of the gold specimen and more than about 0 wt % and at most about 50 wt % of the first metal may be provided. In an embodiment, the first metal may include a metal in which the melting point of an alloy containing gold and the first metal is at most about 400° C. For example, the first metal may include tin (Sn), silicon (Si), aluminum (Al), tungsten (W), antimony (Sb), germanium (Ge), manganese (Mn) or gallium (Ga).

In an embodiment, the gold specimen and the tin specimen may be provided inside of the chamber in powder form. The inside of the chamber may be under a vacuum atmosphere, a foaming gas atmosphere, an inert gas atmosphere, or a mixed gas atmosphere of a foaming gas and an inert gas. In an embodiment, the foaming gas may include a mixed gas of argon and hydrogen and/or a mixed gas of nitrogen and hydrogen. In an embodiment, the inert gas may include an argon gas and/or a nitrogen gas. Oxidation of the gold specimen and the tin specimen may be excluded or minimized under the vacuum atmosphere, the foaming gas atmosphere, the inert gas atmosphere, or the mixed gas atmosphere of the foaming gas and the inert gas.

The gold (Au) and tin (Sn) specimens may undergo a first heat treatment to form a first liquid alloy S120. In an embodiment, the gold specimen and the tin specimen may undergo the first heat treatment under the vacuum atmosphere, the foaming gas atmosphere, the inert gas atmosphere, or the mixed gas atmosphere of the foaming gas and the inert gas. The gold specimen and the tin specimen may be melted through the first heat treatment. In the first heat treatment process, the temperature inside of the chamber may be increased until reaching a first heat treatment temperature, and then maintained for a predetermined time. For example, the temperature inside of the chamber may be increased at a rate or about 5° C./min to about 50° C./min. In an embodiment, the first heat treatment temperature may be higher than the eutectic point of gold and tin. In an embodiment, the first heat treatment temperature may be equal to or higher than the highest temperature among the melting point of gold and the melting point of tin. For example, the temperature of the first heat treatment may by about 800° C. to about 1200° C. Here, the first heat treatment process may be performed for at least 30 minutes. Thereby, the first liquid alloy containing gold and tin may be formed. The first liquid alloy may contain at least about 50 wt % and less than about 100 wt % of gold, and more than about 0 wt % and at most about 50 wt % of tin. Accordingly, the first liquid alloy may have a purity of at least about 18K in terms of gold.

The first liquid alloy containing gold and tin may be cooled to form a solid alloy S130. In an embodiment, the first liquid alloy may be naturally cooled or quenched. For example, the first liquid alloy may be cooled through a quenching in which the temperature is decreased at a rate of about 50° C. to about 200° C. per minute. Thereby, the solid alloy containing gold (Au) and tin (Sn) may be formed. The solid alloy may have amorphous or crystalline phases. The melting point of the solid alloy may be about 400° C. or lower. In an embodiment, the melting point of the solid alloy may be about 260° C. to about 400° C. For example, the melting point of a $Au_{85}Sn_{15}$ alloy may be about 398° C. Here, the mass ratio of gold (Au):tin (Sn) may be about 85:15.

In an embodiment, the first metal may be silicon (Si). Through a process which is substantially the same as the above-described process for forming the solid alloy of gold (Au) and tin (Sn), the solid alloy containing gold (Au) and silicon (Si) may be formed. In an embodiment, the first heat treatment temperature may be higher than the eutectic point of gold and silicon. In an embodiment, the first heat treatment temperature may be equal to or higher than the highest temperature among the melting point of gold and the melting point of silicon. For example, the temperature of the first heat treatment may be about 800° C. to about 1200° C. In an embodiment, the solid alloy containing gold and silicon may have a melting point of about 360° C. to about 400° C. For example, the melting point of a $Au_{96.5}Si_{3.5}$ alloy may be about 395° C. Here, the mass ratio of gold (Au):silicon (Si) may be about 96.5:3.5.

In an embodiment, the first metal may be germanium (Ge). Through a process which is substantially the same as the above-described process for forming the solid alloy of gold (Au) and tin (Sn), the solid alloy containing gold (Au) and germanium (Ge) may be formed. In an embodiment, the first heat treatment temperature may be higher than the eutectic point of gold and germanium. In an embodiment, the first heat treatment temperature may be equal to or higher than the highest temperature among the melting point of gold and the melting point of germanium. For example, the temperature of the first heat treatment may be about 938° C. to about 1500° C. In an embodiment, the solid alloy containing gold and germanium may have a melting point of about 360° C. to about 400° C. For example, the melting point of a $Au_{87}Ge_{13}$ alloy may be about 380° C. Here, the mass ratio of gold (Au):germanium (Ge) may be about 87:13.

In an embodiment, the first metal may be gallium (Ga). Through a process which is substantially the same as the above-described process for forming the solid alloy of gold (Au) and tin (Sn), the solid alloy containing gold (Au) and gallium (Ga) may be formed. In an embodiment, the first heat treatment temperature may be higher than the eutectic point of gold and gallium. In an embodiment, the first heat treatment temperature may be equal to or higher than the highest temperature among the melting point of gold and the melting point of gallium. For example, the temperature of the first heat treatment may be about 800° C. to about 1200° C. In an embodiment, the solid alloy containing gold and gallium may have a melting point of about 330° C. to about 400° C. For example, the melting point of a $Au_{90}Ga_{10}$ alloy may be about 397° C. Here, the mass ratio of gold (Au):gallium (Ga) may be about 90:10.

In an embodiment, the first metal may be antimony (Sb). Through a process which is substantially the same as the above-described process for forming the solid alloy of gold (Au) and tin (Sn), the solid alloy containing gold (Au) and antimony (Sb) may be formed. In an embodiment, the first heat treatment temperature may be higher than the eutectic point of gold and antimony. In an embodiment, the first heat treatment temperature may be equal to or higher than the highest temperature among the melting point of gold and the melting point of antimony. For example, the temperature of the first heat treatment may be about 800° C. to about 1200° C. In an embodiment, the solid alloy containing gold and antimony may have a melting point of at most about 400° C.

The solid alloy may be processed to form the noble metal material for 3D printing S140. In an embodiment, the noble metal material for 3D printing may be powder shaped, granular shaped, or filament shaped. For example, the powder shaped noble metal material for 3D printing may be used by being contained in a cartridge. For example, the filament shaped noble metal material for 3D printing may be used by being wound on a roll. According to an embodiment of the inventive concept, the noble metal material for 3D printing may be melted at or below 400° C. to be discharged to the outside of a nozzle. The discharged noble metal for 3D printing may be cooled. In an embodiment, the cooling may be natural cooling and/or cooling using a fan. The noble metal material for 3D printing may be discharged on the cooled noble metal material again, and cooled. In an embodiment, the cooling may be natural cooling and/or cooling using a fan. By repeating the above process, a three-dimensional structure may be formed using the noble metal material for 3D printing.

Figure 2:
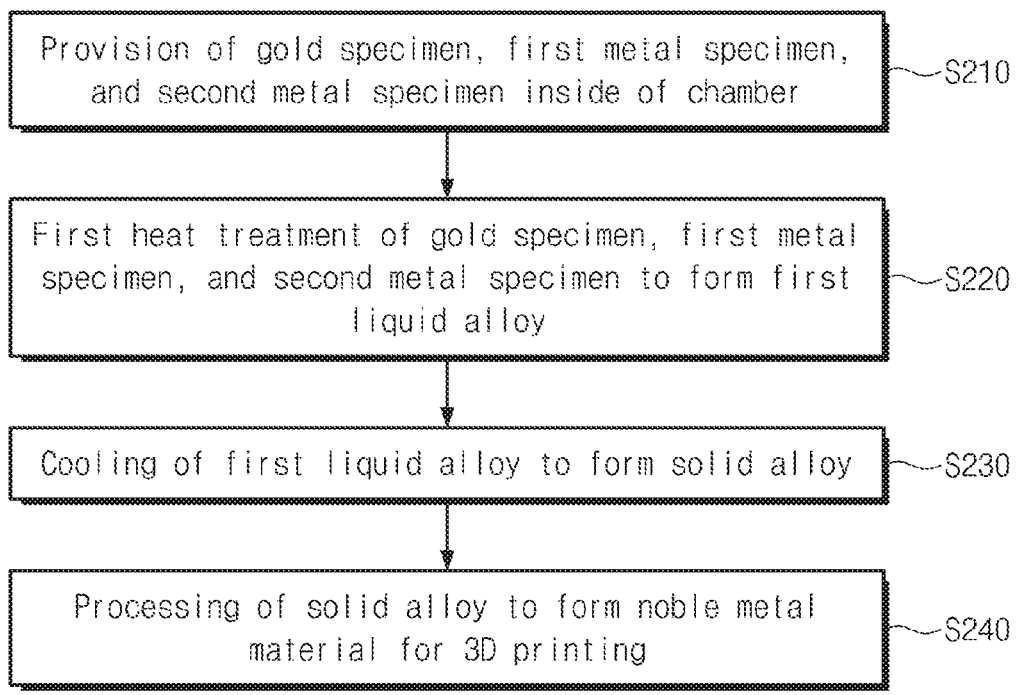

Referring to FIG. 2, the gold (Au) specimen, the first metal specimen, and a second metal specimen may be provided inside of the chamber S210. In an embodiment, the first metal may be substantially the same as the first metal that is described with reference to FIG. 1. In an embodiment, the second metal may include a metal in which the melting point of an alloy containing gold, the first metal and the second metal is at most about 400° C. For example, the second metal may include gallium (Ga), indium (In), bismuth (Bi), lead (Pb), or germanium (Ge). In an embodiment, at least 50 wt % and less than about 100 wt % of gold, more than about 0 wt % and at most about 50 wt % of the first metal, and more than about 0 wt % and at most about 25 wt % of the second metal may be provided. In an embodiment, a gold (Au) specimen, a tin (Sn) specimen, and a gallium (Ga) specimen may be provided inside of the chamber in a powder form. Description about the chamber and the atmosphere inside of the chamber may be substantially the same as the description given with reference to FIG. 1.

The gold (Au) specimen, the tin (Sn) specimen, and the gallium (Ga) specimen may undergo the first heat treatment to form the first liquid alloy S220. In an embodiment, the gold (Au) specimen, the tin (Sn) specimen, and the gallium (Ga) specimen may undergo the first heat treatment under the vacuum atmosphere, the foaming gas atmosphere, the inert gas atmosphere, or the mixed gas atmosphere of the foaming gas and the inert gas. The gold specimen, the tin specimen, and the gallium specimen may be melted through the first heat treatment. In the first heat treatment process, the temperature inside of the chamber may be increased until reaching the first heat treatment temperature, and then maintained for a predetermined time. For example, the temperature inside of the chamber may be increased at a rate or about 5° C./min to about 50° C./min. In an embodiment, the first heat treatment temperature may be higher than the eutectic point of gold, tin, and gallium. In an embodiment, the first heat treatment temperature may be equal to or higher than the highest temperature among the melting point of gold, the melting point of tin, and the melting point of gallium. For example, the temperature of the first heat treatment may by about 800° C. to about 1200° C. Here, the first heat treatment process may be performed for at least 30 minutes. Thereby, the first liquid alloy containing gold, tin, and gallium may be formed. The first liquid alloy may contain at least about 50 wt % and less than about 100 wt % of gold, more than about 0 wt % and at most about 50 wt % of tin, and more than about 0 wt % and at most about 25 wt % of gallium. Thereby, the first liquid alloy may have a purity of at least about 18K in terms of gold.

The first liquid alloy containing gold (Au), tin (Sn), and gallium (Ga) may be cooled to form the solid alloy S230. In an embodiment, the first liquid alloy may be naturally cooled or quenched. For example, the first liquid alloy may be cooled through a quenching in which the temperature is decreased at a rate of about 50° C. to about 200° C. per minute. Thereby, the solid alloy containing gold (Au), tin (Sn), and gallium (Ga) may be formed. The solid alloy may have amorphous or crystalline phases. The melting point of the solid alloy may be about 400° C. or lower. In an embodiment, the melting point of the solid alloy containing gold, tin, and gallium may be about 260° C. to about 400° C. For example, the melting point of a $Au_{60.70}Sn_{15.95}Ga_{23.35}$ alloy may be about 297° C. Here, the mass ratio of gold: tin:gallium may be about 60.70:15.95:23.35.

In an embodiment, instead of gallium (Ga), the second metal may be any one of indium (In), bismuth (Bi), germanium (Ge) or lead (Pb). In an embodiment, the first heat treatment temperature may be higher than the eutectic temperature of gold, tin, and the second metal. In an embodiment, the first heat treatment temperature may be equal to or higher than the highest temperature among the melting point of gold, the melting point of tin, and the melting point of the second metal. For example, when the second metal is indium, bismuth, or lead, the first heat treatment temperature may be about 800° C. to about 1200° C. For example, when the second metal is germanium, the first heat treatment temperature may be about 938° C. to about 1500° C. In an embodiment, more than about 0 wt % and at most about 25 wt % of any one of indium, bismuth, germanium, or lead may be contained in the solid alloy.

In an embodiment, the solid alloy containing gold (Au), silicon (Si), and gallium (Ga) may be formed through a process which is substantially the same as the process described, with reference to FIG. 2, for manufacturing the solid alloy containing gold (Au), tin (Sn), and gallium (Ga). The solid alloy may have amorphous or crystalline phases. The melting point of the solid alloy may be about 340° C. to about 400° C. For example the melting point of a $Au_{91.54}Si_{3.99}Ga_{4.47}$ alloy may be about 375° C.

In an embodiment, the solid alloy containing gold (Au), silicon (Si), and germanium (Ge) may be formed through a process which is substantially the same as the process described, with reference to FIG. 2, for manufacturing the solid alloy containing gold (Au), tin (Sn), and gallium (Ga). The solid alloy may have amorphous or crystalline phases. The melting point of the solid alloy may be about 330° C. to about 400° C. For example the melting point of a $Au_{93.22}Si_{2.49}Ge_{4.29}$ alloy may be about 391° C.

In an embodiment, the solid alloy containing gold (Au), silicon (Si), and bismuth (Bi) may be formed through a process which is substantially the same as the process described, with reference to FIG. 2, for manufacturing the solid alloy containing gold (Au), tin (Sn), and gallium (Ga). The solid alloy may have amorphous or crystalline phases. The melting point of the solid alloy may be about 340° C. to about 400° C. For example the melting point of a $Au_{91.58}Si_{3.98}Bi_{4.44}$ alloy may be about 371° C.

The solid alloy may be processed to form the noble metal material for 3D printing S240. In an embodiment, the noble metal material for 3D printing may be powder shaped, granular shaped, or filament shaped. In an embodiment, the powder shaped noble metal material for 3D printing may be used by being contained in a cartridge. In an embodiment, the filament shaped noble metal material for 3D printing may be used by being wound on a roll. In an embodiment, the noble metal material for 3D printing may have a liquid phase. According to an embodiment of the inventive concept, the noble metal material for 3D printing may be melted at or below 400° C. to be discharged to the outside of a nozzle. The discharged noble metal for 3D printing may be cooled. In an embodiment, the cooling may be natural cooling and/or cooling using a fan. The noble metal material for 3D printing may be discharged on the cooled noble metal material again, and cooled. By repeating the above process, the three-dimensional structure may be formed using the noble metal material for 3D printing.

Figure 3:
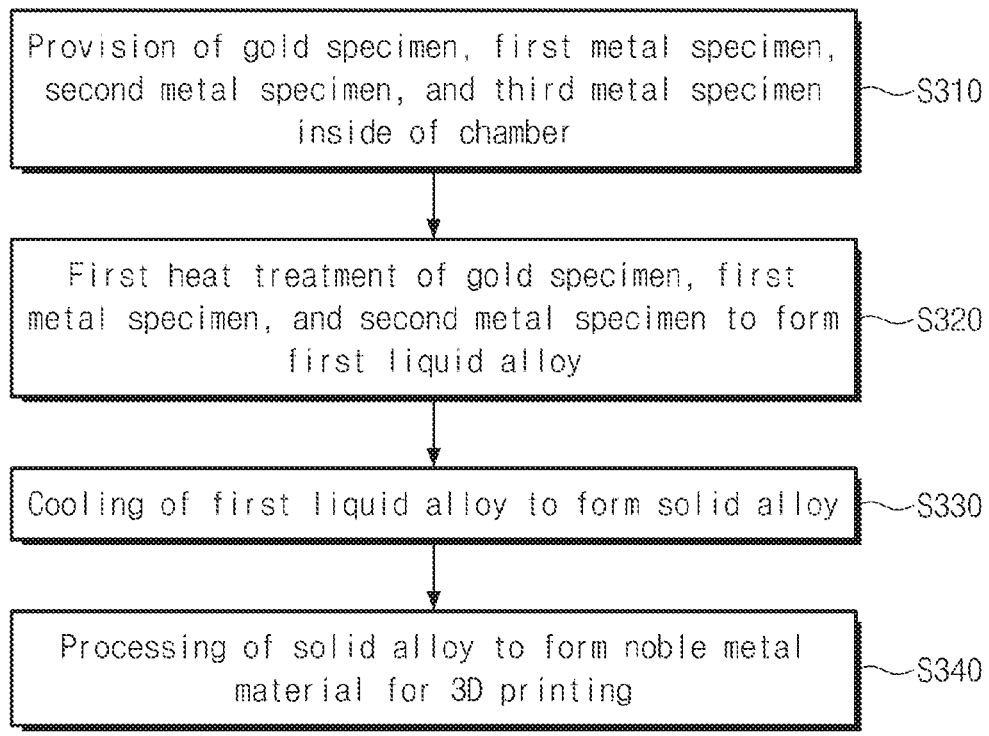

Referring to FIG. 3, the gold (Au) specimen, the first metal specimen, the second metal specimen, and a third metal specimen may be provided inside of the chamber S310. In an embodiment, the first metal and the second metal may be substantially the same as described with reference to FIGS. 1 and 2. In an embodiment, the third metal may include a metal in which the melting point of an alloy containing gold, the first metal, the second metal, and the third metal is at most 400° C. For example, the third metal may include copper (Cu), silver (Ag), platinum (Pt), or palladium (Pd). In an embodiment, at least about 50 wt % and less than about 100 wt % of gold, more than about 0 wt % and at most about 50 wt % of the first metal, more than about 0 wt % and at most about 25 wt % of the second metal, and more than about 0 wt % and at most about 5 wt % of the third metal may be provided. In an embodiment, a gold (Au) specimen, a tin (Sn) specimen, a gallium (Ga), and a copper (Cu) specimen may be provided inside of the chamber in a powder form. Description about the chamber and the atmosphere inside of the chamber may be substantially the same as the description given with reference to FIG. 1.

The gold (Au) specimen, the tin (Sn) specimen, the gallium (Ga) specimen, and the copper (Cu) specimen may undergo the first heat treatment to form the first liquid alloy S320. In an embodiment, the gold (Au) specimen, the tin (Sn) specimen, the gallium (Ga) specimen, and the copper (Cu) specimen may undergo the first heat treatment under the vacuum atmosphere, the foaming gas atmosphere, the inert gas atmosphere, or the mixed gas atmosphere of the foaming gas and the inert gas. The gold specimen, the tin specimen, the gallium specimen, and the copper specimen may be melted through the first heat treatment.

In the first heat treatment process, the temperature inside of the chamber may be increased until reaching the first heat treatment temperature, and then maintained for a predetermined time. For example, the temperature inside of the chamber may be increased at a rate or about 5° C./min to about 50° C./min. In an embodiment, the first heat treatment temperature may be higher than the eutectic point of gold, tin, gallium, and copper. In an embodiment, the first heat treatment temperature may be equal to or higher than the highest temperature among the melting point of gold, the melting point of tin, the melting point of gallium, and the melting point of copper. For example, the temperature of the first heat treatment may by about 800° C. to about 1200° C. Here, the first heat treatment process may be performed for at least 30 minutes. Thereby, the first liquid alloy containing gold, tin, gallium, and copper may be formed. The first liquid alloy may contain at least about 50 wt % and less than about 100 wt % of gold, more than about 0 wt % and at most about 50 wt % of tin, more than about 0 wt % and at most about 25 wt % of gallium, and more than about 0 wt % and at most about 5 wt % of copper. Thereby, the first liquid alloy may have a purity of at least about 18K in terms of gold.

The first liquid alloy containing gold (Au), tin (Sn), gallium (Ga) and copper (Cu) may be cooled to form the solid alloy S330. In an embodiment, the first liquid alloy may be naturally cooled or quenched. For example, the first liquid alloy may be cooled through a quenching in which the temperature is decreased at a rate of about 50° C. to about 200° C. per minute. Thereby, the solid alloy containing gold (Au), tin (Sn), gallium (Ga), and copper (Cu) may be formed. The solid alloy may have amorphous or crystalline phases. The melting point of the solid alloy may be about 400° C. or lower. In an embodiment, the melting point of the solid alloy containing gold, tin, gallium, and copper may be about 260° C. to about 400° C. For example, the melting point of a $Au_{64.68}Sn_{21.94}Ga_{6.38}Cu_7$ alloy may be about 278° C. Here, the mass ratio of gold:tin:gallium:copper may be about 64.68:21.94:6.38:7. The strength of the noble metal material for 3D printing may be strengthened due to the alloy containing copper.

In an embodiment, instead of copper (Cu), the third metal may include any one of silver (Ag), platinum (Pt), or palladium (Pd). In an embodiment, the first heat treatment temperature may be higher than the eutectic temperature of gold, the first metal, the second metal, and the third metal. In an embodiment, the first heat treatment temperature may be equal to or higher than the highest temperature among the melting point of gold, the melting point of the first metal, the melting point of the second metal, and the melting point of the third metal. For example, the first heat treatment temperature may be about 800° C. to about 1200° C.

The solid alloy may be processed to form the noble metal material for 3D printing S340. The noble metal material for 3D printing may be powder shaped, granular shaped, or filament shaped. In an embodiment, the powder shaped noble metal material for 3D printing may be used by being contained in a cartridge. In an embodiment, the filament shaped noble metal material for 3D printing may be used by being wound on a roll. In an embodiment, the noble metal material for 3D printing may have a liquid phase. According to an embodiment of the inventive concept, the noble metal material for 3D printing may be melted at or below 400° C. to be discharged to the outside of a nozzle. The discharged noble metal for 3D printing may be cooled. In an embodiment, the cooling may be natural cooling and/or cooling using a fan. The noble metal material for 3D printing may be discharged on the cooled noble metal material again, and cooled. By repeating the above process, the three-dimensional structure may be formed using the noble metal material for 3D printing.

Figure 4:
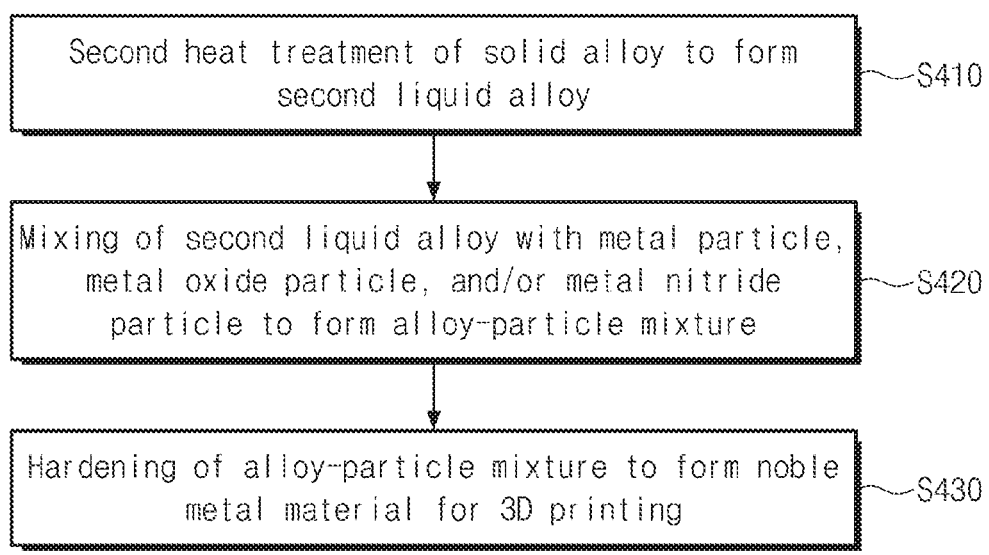

Referring to FIG. 4, the solid alloy described with reference to FIGS. 1 to 3 may undergo a second heat treatment to form a second liquid alloy S410. The temperature of the second heat treatment may be lower than about 400° C. and higher than the melting temperature of the solid alloy. The second heat treatment may be performed until the solid alloy is melted.

A metal particle, a metal oxide particle, and/or a metal nitride particle may be mixed with the second liquid alloy to form an alloy-particle mixture S420. In an embodiment, the metal particle may contain at least one of gold (Au), silver (Ag), platinum (Pt), tin (Sn), or copper (Cu). In an embodiment, the metal oxide particle may include a copper oxide and/or an iron oxide particle. The metal particle, the metal oxide particle, and/or the metal nitride particle may be a microparticle and/or a nanoparticle. The microparticle may be a particle having a size of about $10^{-6}$ m to about $10^{-3}$ m. The nanoparticle may be a particle having a size of about $10^{-9}$ m to about $10^{-6}$ m. The metal particle, the metal oxide particle, and the metal nitride particle may have a melting point above about 400° C. The metal particle, the metal oxide particle, and the metal nitride particle may not be melted through the second heat treatment. Accordingly, the alloy-particle mixture may be in a state in which the metal particle, the metal oxide particle, and/or the metal nitride particle are mixed with the second liquid alloy. A plurality of the metal particles, the metal oxide particles, and the metal nitride particles may be provided. The fraction of the plurality of metal particles, metal oxide particles, and/or metal nitride particles in the alloy-particle mixture may be about several to several ten wt %.

The viscosity of the alloy-particle mixture may be greater than the viscosity of the second liquid alloy. Here, the viscosity of the alloy-particle mixture may increase as the weight percentage of the particles in the alloy-particle mixture increases. In an embodiment, the alloy-particle mixture in which gold (Au) or silver (Ag) coated copper (Cu) particles are mixed with the liquid alloy containing gold (Au), silicon (Si), and germanium (Ge) may be provided. For example, the viscosity of the $Au_{93.21}S_{2.49}Ge_{4.29}$ liquid alloy may be about 10 cP at about 400° C. The alloy-particle mixture having a viscosity of about 4000 cP may be provided by mixing about 20 wt % of the gold (Au) or silver (Ag) coated copper (Cu) particles with the liquid alloy. The melting points of the liquid alloy and the alloy-particle mixture may be substantially the same. Here, the melting point of the alloy-particle mixture may be the temperature at which the alloy included in the alloy-particle mixture melts. That is, the coated copper particles included in the alloy-particle mixture may not melt at the melting point of the alloy-particle mixture. In an embodiment, the thickness of the gold (Au) or silver (Ag) coating may be about several to several hundred nanometers (nm). In an embodiment, the size of the coated copper particle may be about 5 micrometers (μm). In an embodiment, the shape of the coated copper particle may be in the shape of a flake.

In an embodiment, the metal particles, the metal oxide particles, and/or the metal nitride particles may be mixed with the second liquid alloy to control the color of the noble metal material for 3D printing. For example, the gold (Au) particle may be mixed with the second liquid alloy such that the noble metal material for 3D printing has a gold color. For example, the copper (Cu) particle may be mixed with the second liquid alloy such that the noble metal material has a red color. For example, the copper oxide particle or the iron oxide particle may be mixed with the second liquid alloy such that the noble metal material has a green color or a blue color.

The alloy-particle mixture may be hardened to form the noble metal material for 3D printing S430. In an embodiment, the alloy-particle mixture may be hardened to provide the noble metal material for 3D printing. For example, the noble metal material for 3D printing may be powder shaped, granular shaped, or filament shaped. In an embodiment, the powder shaped noble metal material for 3D printing may be used by being stored in a cartridge. In an embodiment, the filament shaped metal material for 3D printing may be used by being wound on a roll. In an embodiment, the noble metal material for 3D printing may include a liquid phase. According to an embodiment of the inventive concept, the noble metal material for 3D printing may be melted at or below 400° C. to be discharged to the outside of the nozzle. The discharged noble metal for 3D printing may be cooled. In an embodiment, the cooling may be natural cooling and/or cooling using a fan. The noble metal material for 3D printing may be discharged on the cooled noble metal material again, and cooled. By repeating the above process, the three-dimensional structure may be formed using the noble metal material for 3D printing.

Hereinafter, description is given of a 3D printer and a 3D printing method which use the noble metal material of the embodiment.

Figure 5:
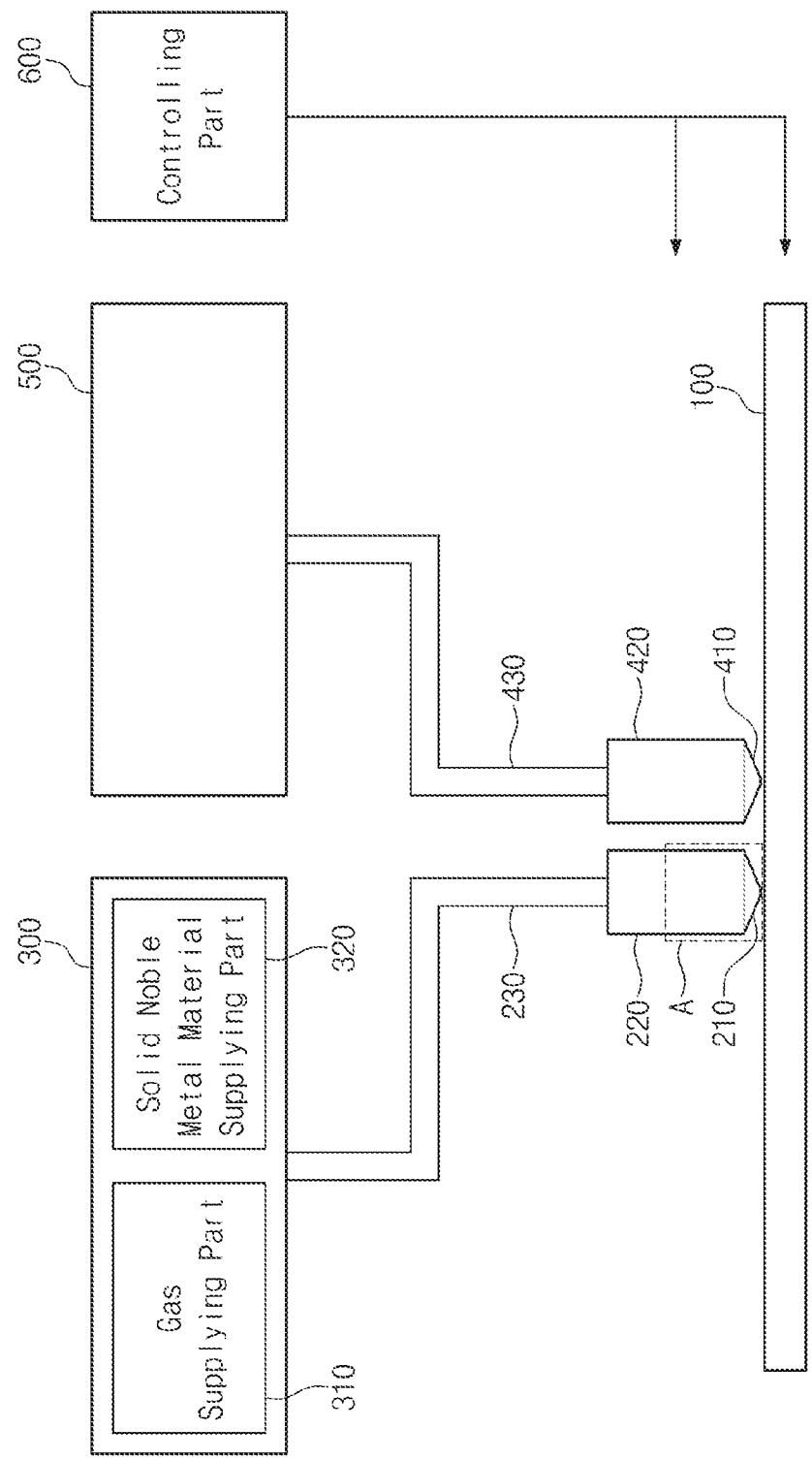
FIG. 5 is a drawing illustrating a 3D printer that uses a noble metal material according to an embodiment of the inventive concept.
Figure 6:
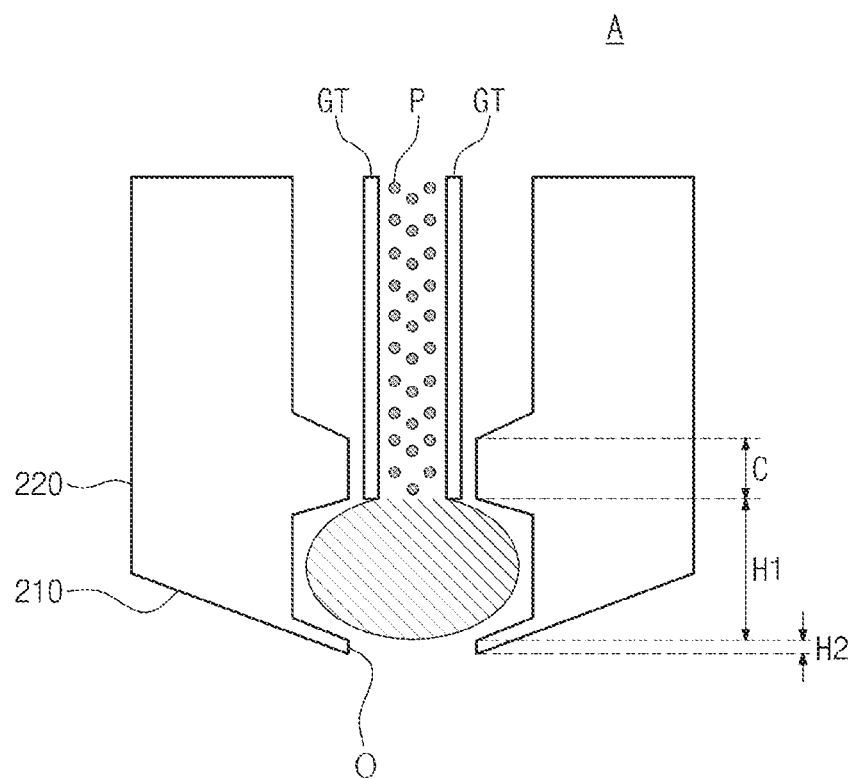
FIGS. 6 and 7 are expanded views for illustrating a nozzle in a 3D printer that uses a noble metal material according to an embodiment of the inventive concept, and correspond to A in FIG. 5.
Figure 7:
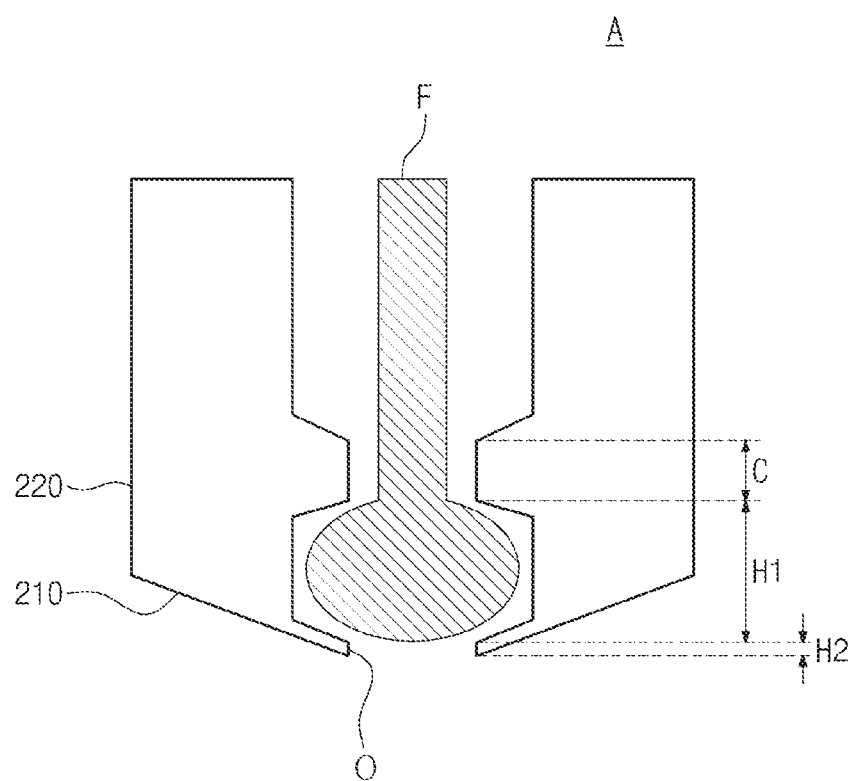

FIG. 5 is a drawing illustrating the 3D printer that uses the noble metal material according to an embodiment of the inventive concept. FIGS. 6 and 7 are expanded views for illustrating the nozzle in the 3D printer that uses the noble metal material according to an embodiment of the inventive concept, and correspond to A in FIG. 5. For conciseness of illustration, description which is substantially the same as given with reference to the above FIGS. 1 to 4 is excluded. For conciseness of illustration, the 3D printer is illustrated schematically.

Referring to FIG. 5, a supporting substrate 100 may be provided at the bottom of the 3D printer. The supporting substrate 100 may provide an area for performing the 3D printing. In an embodiment, the supporting substrate 100 may be moved in a parallel direction to the top surface of the supporting substrate 100. The supporting substrate 100 may be moved by a below-described controlling part 600. In another embodiment, the supporting substrate 100 may be fixed, and the 3D printing may be performed through movement of below-described nozzles 210 and 410.

Hereinafter, description is given of a first nozzle 210, and the like, which may discharge the noble metal material according to an embodiment of the inventive concept.

A first cylinder 220 and the first nozzle 210 which are spaced apart from the top surface of the supporting substrate 100 may be provided. The first nozzle 210 may protrude from bottom of the first cylinder 220 toward the top surface of the supporting substrate 100. The first cylinder 220 may extend from a side wall of the first nozzle 210 in a direction perpendicular to the top surface of the supporting substrate 100. The first nozzle 210 may melt the noble metal material and discharge the noble metal material on the supporting substrate 100. In an embodiment, the first nozzle 210 may heat treat the noble metal material at about 280° C. to about 400° C. to melt the noble metal material. The noble metal material may be substantially the same as the noble metal material described with reference to FIG. 1-4. The first cylinder 220 may receive the noble metal material from a below-described solid noble metal material supplying part 320 to provide the noble metal material to the first nozzle 210. The first nozzle 210 and the first cylinder 220 may be moved in a parallel direction to the supporting substrate 100 and in a perpendicular direction to the supporting substrate 100.

Referring to FIG. 6, the first cylinder 220 which supplies the noble metal material P and F to the first nozzle 210 may be provided. The noble metal material P and F may be a powder shaped noble metal material P or a filament shaped noble metal material F. The powder shaped noble metal material P may be substantially the same as the noble metal material for 3D printing manufactured in a powder shape and described with reference to FIG. 1-4.

When the noble metal material is powder shaped, the first cylinder 220 may have an empty space inside of which a guide tube GT is disposed. The guide tube GT may be disposed spaced apart from an inner side wall of the first cylinder 220. The guide tube GT may be filled with the powder shaped noble metal material P. The guide tube GT may have an outlet which supplies the powder shaped noble metal material to the first cylinder 220 and/or the first nozzle 210. The guide tube GT may supply the powder shaped noble metal material to a below-described first heating part H1. The filament shaped noble metal material F may be directly supplied into the first cylinder 220. That is, when the noble metal material is filament shaped, the first cylinder 220 may exclude the guide tube. The material in the first cylinder 220 may include a non-metal. For example, the material in the first cylinder 220 may be any one of a ceramic, Teflon, a glass, a quartz, or an aluminum that has an anodized surface. In an embodiment, the inner side wall of the first cylinder 220 may be coated with Teflon.

The first nozzle 210 may discharge the noble metal material P and F on the supporting substrate 100. The first nozzle 210 may have an empty space therein. The empty space in the first nozzle 210 and the empty space in the first cylinder 220 may be connected to each other. The first nozzle 210 may have an opening O through which the noble metal material P and F is discharged. The opening O in the first nozzle 210 may connect the inside of the first nozzle 210 with the outside of the first nozzle 210. The material in the first nozzle 210 may include a non-metal. For example, the material in the first nozzle 210 may be any one of a ceramic, Teflon, a glass, a quartz, or an aluminum that has an anodized surface. In an embodiment, the inside of the first nozzle 210 may be coated with Teflon.

The first heating part H1 may be disposed inside of the first nozzle 210. A portion of the first heating part H1 may be disposed inside of the first cylinder 220. The noble metal material P and F may be heat treated in the first heating part H1 to melt an alloy component contained in the noble metal material P and F. The temperature of the first heating part H1 may be about 100° C. to about 400° C. For example, the temperature of the first heating part H1 may be about 280° C. to about 400° C. In an embodiment, the noble metal material P and F in which an alloy containing gold (Au), tin (Sn), and gallium (Ga) is mixed with a gold (Au) particle may be provided in the first heating part H1. When the noble metal material P and F is heat treated in the first heating part H1, the alloy may be melted. Since the melting point (about 1000° C. or higher) of the gold particle may be higher than the temperature (about 400° C.) of the first heating part H1, the gold particle may not be melted in the first heating part H1. Accordingly, a mixture of the alloy having a liquid phase and the gold particle may be formed in the heating part H1.

A cooling part C contacting the top of the first heating part H1 may be provided. The cooling part C may cool the filament shaped noble metal or the powder shaped noble metal material P which is discharged from the guide tube GT to a temperature equal to or below the melting point of the noble metal material P and F. In an embodiment, the cooling part C may prevent the powder shaped noble metal material P in the guide tube GT from melting. When the powder shaped noble metal material P in the guide tube GT is melted, the guide tube GT may be blocked. Thus, the cooling part C may prevent the guide tube GT from being blocked during the heat treatment process.

A second heating part H2 that contacts the bottom of the first heating part H1 may be provided. The second heating part H2 may be disposed at the opening O in the first nozzle 210. The second heating part H2 may receive the molten noble metal material P and F that is transported from the first heating part H1. The second heating part H2 may discharge the noble metal material P and F by heating the noble metal material P and F to a lower temperature than the first heating part H1. When the temperature of the noble metal material P and F drops below the melting point too quickly, the noble metal material P and F may harden before being laminated. The second heating part H2 heats the noble metal material P and F until just prior to discharge such that the noble metal material P and F hardens after being laminated. Consequently, the three dimensional structure including the noble metal material P and F may be 3D printed. The temperature of the second heating part H2 may be about 100° C. to about 400° C.

Referring again to FIG. 5, a first supplying part 300 which may supply a foaming gas (or inert gas) and the noble metal material to the first cylinder 220 and the first nozzle 210 may be provided. The foaming gas and inert gas may be substantially the same as described with reference to FIGS. 1 to 4, and thus description thereof is excluded. The first supplying part 300 may be connected to the first cylinder 220 through a first supplying tube 230. The first supplying part 300 may include a gas supplying part 310 and a solid noble metal material supplying part 320. In an embodiment, the solid noble metal material supplying part 320 may be a cartridge. For example, the cartridge may supply the powder shaped noble metal material to the first cylinder 220 and the first nozzle 210. In an embodiment, the cartridge may supply the molten noble metal material to the first nozzle 210. In an embodiment, the solid noble metal material supplying part 320 may be a filament roll. The filament roll may supply the filament shaped noble metal material to the first cylinder 220 and the first nozzle 210. The gas supplying part 310 may supply the inert gas or the foaming gas to the first cylinder 220.

Hereinafter, description is given of a second nozzle 410 which may discharge a plastic material, and the like.

The second nozzle 410 and a second cylinder 420 may be provided on the supporting substrate 100. The second nozzle 410 may discharge the plastic material (for example, poly lactic acid (PLA) or acrylonitrile butadiene styrene (ABS)). In an embodiment, the plastic material may be a filament shaped material or a powder shaped material. The second cylinder 420 may provide the plastic material to the second nozzle 410. In an embodiment, the second nozzle 410 may discharge the filament shaped plastic material. Here, the second cylinder 420 may be excluded. In an embodiment, the second nozzle 410 and the second cylinder 420 may be coupled with the first nozzle 210 and the first cylinder 220 so as to move together. Accordingly, the second nozzle 410 and the second cylinder 420 may be moved identically to the first nozzle 210 and the first cylinder 220. The second nozzle 410 and the second cylinder 420 may be moved in a parallel direction and a perpendicular direction to the top surface of the supporting substrate 100.

A second supplying part 500 which supplies the plastic material to the second nozzle 410 and the second cylinder 420 may be provided. The second supplying part 500 may be connected to the second cylinder 420 through a second supplying tube 430. In an embodiment, the second supplying part 500 may be a filament roll or a cartridge. For example, the cartridge may supply the powder shaped plastic material to the second cylinder 420.

The controlling part 600 that moves the supporting substrate 100, the first nozzle 210, and/or the second nozzle 410 may be provided. The controlling part 600 may move the supporting substrate 100, the first nozzle 210, and the second nozzle 410 in a direction that forms the desired three dimensional structure. The first nozzle 210 and the second nozzle 410 may respectively melt discharge the noble metal material and the plastic material in a single process. Thus, a separate process for hardening the noble metal material may not be required. For example, immediately after the melt discharging of the plastic material, the noble metal material may be melt discharged on the plastic material. In another embodiment, the noble metal material and the plastic material may be respectively melt discharged at the same time from the first nozzle 210 and the second nozzle 410. Consequently, the method for 3D printing the noble metal material at a temperature of at most about 400° C., and the three dimensional printer capable of performing the manufacturing method may be provided.

According to an embodiment of the inventive concept, a noble metal material used for 3D printing and having a melting point of at most about 400° C., a 3D printing method using the same, and a method for manufacturing the same may be provided. The melting point of the noble metal material of the embodiment may be similar to the melting point of a plastic material (for example, poly lactic acid (PLA)). When the noble metal material of the embodiment is melted and discharged on the plastic material, the plastic material may maintain the original shape without melting. Consequently, lamination of the noble metal material of the embodiment and lamination of the plastic material may be performed in a single melt lamination process.

However, the effects of an embodiment of the inventive concept are not limited to the above.

The above description of exemplary embodiments of the technical concept of the present invention provides examples for describing the technical concept of the present invention. Therefore, it is understood that the present invention should not be limited to these exemplary embodiments but various changes and modifications can clearly be made by one with ordinary skill in the art within the spirit and scope of the present invention.

What is claimed is:

1. A noble metal material for 3D printing, the noble metal material comprising an alloy that contains:
    gold (Au);
    a first metal that is different from the gold;
    metal particles, a melting point of the metal particles exceeding 400° C.; and
    metal oxide particles having a melting point that exceeds 400° C. and containing at least one of copper oxide particles or iron oxide particles,
    wherein the alloy contains at least 50 wt % and less than 100 wt % of the gold and contains more than 0 wt % and at most 50 wt % of the first metal, and
    a melting point of the alloy is at most 400° C.

2. The noble metal material of claim 1, wherein the first metal is any one of tin (Sn), silicon (Si), germanium (Ge), antimony (Sb), or gallium (Ga).

3. The noble metal material of claim 1, wherein the alloy further comprises a second metal, the second metal being a different metal from the gold and the first metal, and the alloy containing more than 0 wt % and at most 25 wt % of the second metal.

4. The noble metal material of claim 3, wherein the first metal is germanium (Ge).

5. The noble metal material of claim 4, wherein the second metal is any one of gallium (Ga), indium (In), or bismuth (Bi).

6. The noble metal material of claim 3, wherein the first metal is any one of tin (Sn), silicon (Si), or antimony (Sb).

7. The noble metal material of claim 3, wherein the second metal is any one of gallium (Ga), indium (In), germanium (Ge), or bismuth (Bi).

8. The noble metal material of claim 3, wherein the alloy further contains a third metal, the third metal being a different metal than the gold, the first metal, and the second metal, and the alloy containing more than 0 wt % and at most 5 wt % of the third metal.

9. The noble metal material of claim 8, wherein the third metal is any one of copper (Cu), silver (Ag), platinum (Pt), or palladium (Pd).

10. The noble metal material of claim 1, wherein the metal particles contain at least one of gold (Au), silver (Ag), platinum (Pt), tin (Sn), or copper (Cu).

11. A method for manufacturing a noble metal material for 3D printing, the method comprising:
    forming a first liquid alloy by melting gold (Au), a first metal that is different from the gold, at a first temperature, metal particles having a melting point that exceeds 400° C., and metal oxide particles having a melting point that exceeds 400° C. and containing at least one of copper oxide particles or iron oxide particles; and
    forming a solid alloy through a first cooling of the first liquid alloy,
    wherein the first liquid alloy contains 50 wt % to less than 100 wt % of the gold (Au) and contains more than 0 wt % and at most 50 wt % of the first metal, and
    the first temperature is higher than the melting temperature of the gold (Au) and the melting temperature of the first metal, and
    the melting point of the solid alloy is at most 400° C.

12. The method of claim 11, wherein the melting process is performed under a vacuum atmosphere, a foaming gas atmosphere, or an inert gas atmosphere.

13. The method of claim 11, wherein, in the first cooling, the temperature decreases at a rate of 50° C. to 200° C. per minute.

14. The method of claim 11, comprising:
    forming a second liquid alloy through a second heat treatment of the solid alloy at a second temperature which is lower than the first temperature;
    forming a mixture by mixing the second liquid alloy with at least one of a metal particle or a metal oxide particle; and
    performing a second cooling on the mixture,
    wherein the second temperature exceeds the melting point of the solid alloy and is below the melting points of the metal particle and the metal oxide particle.

15. A 3D printing method, comprising:
    melting a noble metal material by performing heat treatment at a temperature of 280° C. to 400° C.; and
    forming a three dimensional structure by extruding the molten noble metal material through a nozzle and then cooling the molten noble metal,
    wherein:
    the noble metal material includes an alloy that contains:
        gold (Au),
        a first metal that is different from the gold,
        metal particles having a melting point that exceeds 400° C. and
        metal oxide particles having a melting point that exceeds 400° C. and containing at least one of copper oxide particles or iron oxide particles,
the alloy contains 50 wt % to less than 100 wt % of the gold and contains more than 0 wt % and at most 50 wt % of the first metal, and
the melting point of the alloy is at most 400° C.

16. The method of claim 15, wherein the alloy further comprises a second metal, the second metal being a different metal from the gold (Au) and the first metal, and the alloy containing more than 0 wt % and at most 25 wt % of the second metal.

17. The method of claim 16, wherein the alloy further contains a third metal that is different from the gold (Au), the first metal, and the second metal, the third metal being any one of copper (Cu), silver (Ag), platinum (Pt) or palladium (Pd), and the alloy containing more than 0 wt % and at most 5 wt % of the third metal.

18. The method of claim 15, further comprising melting and laminating a plastic material, wherein the noble metal material and the plastic material form a single three dimensional structure.

* * * * *